United States Patent [19]
Mizukami et al.

[11] Patent Number: 5,286,701
[45] Date of Patent: * Feb. 15, 1994

[54] METHOD FOR PREPARING HYDRAZINOLYSIS CATALYST

[75] Inventors: Fujio Mizukami; Tsuneji Sano, both of Ibaraki; Koji Masuda, Tokyo, all of Japan

[73] Assignees: Agency of Industrial Science and Technology; Nissan Motor Company, Ltd., both of Japan

[*] Notice: The portion of the term of this patent subsequent to Feb. 9, 2010 has been disclaimed.

[21] Appl. No.: 876,809

[22] Filed: Apr. 30, 1992

Related U.S. Application Data

[63] Continuation-in-part of Ser. No. 665,544, Mar. 5, 1991, abandoned.

[30] Foreign Application Priority Data

Mar. 6, 1990 [JP] Japan .................................. 2-52616

[51] Int. Cl.$^5$ .......................................... B01J 23/56
[52] U.S. Cl. .......................................... 502/332; 149/36
[58] Field of Search ........................... 502/332; 149/36

[56] References Cited

U.S. PATENT DOCUMENTS

| | | | |
|---|---|---|---|
| 3,929,682 | 12/1975 | Kuhrt et al. | 502/332 |
| 4,324,819 | 4/1982 | Birbara et al. | 149/36 X |
| 5,185,312 | 2/1993 | Mizukami et al. | 502/332 |

FOREIGN PATENT DOCUMENTS 1216240 12/1970 United Kingdom ................. 502/332

Primary Examiner—E. D. McFarlane
Assistant Examiner—E. D. Irzinski
Attorney, Agent, or Firm—Lowe, Price, LeBlanc & Becker

[57] ABSTRACT

A catalyst for hydrazinolysis having high catalytic activity and long life concurrently with high thermal resistance is disclosed. The catalyst is composed of an alumina support having a substantially extended specific surface area and iridium being substantially supported thereon. The alumina support is prepared by the steps of adding aluminum alkoxide into hexyleneglycol (2-methyl-2, 4-pentanediol), heating at temperatures between 100° and 200° C. to form a sol, hydrolyzing the sol to a gel, and drying and calcining the gel.

5 Claims, 2 Drawing Sheets

METHOD FOR PREPARING HYDRAZINOLYSIS CATALYST

This application is a continuation-in-part application Ser. No. 07/665,544 filed Mar. 5, 1991 and now abandoned.

BACKGROUND OF THE INVENTION

1. Field of the Invention

The present invention relates generally to a method for preparing a hydrazinolysis catalyst. Specifically, the present invention relates to a method for preparing a hydrazinolysis catalyst wherein a specific surface area thereof is extended.

2. Description of the Background Art

Hydrazinolysis is a well known reaction in the art as indicated in the following reaction formula:

$$N_2H_4 \rightarrow N_2 + 2H_2$$

Alternatively;

$$3N_2H_4 \rightarrow 4NH_3 + N_2$$

$$2NH_3 \rightarrow N_2 + 3H_2.$$

The above mentioned reaction is catalyzed by hydrazinolysis catalysts which are conventionally composed of iridium (Ir) supported on an inorganic catalyst support. Generally, 30 to 40 wt % of Ir is substantially dispersed on an alumina support having a diameter of 25 to 30 mesh, formed by a conventional technique such as thermal decomposition. Hydrazine is decomposed as shown in the above reaction when contacting the surface of the Ir.

Generally, the thrust of a hydrazine thruster for combustion in a rocket engine, for example, can be obtained from the aforementioned decomposition reaction.

However, there are certain problems when using the above conventional catalyst. The specific surface area of the alumina support formed by the conventional technique limits the amount of Ir supported thereon. When large amount of Ir is supported on the surface, homogeneous dispersion of the Ir thereon cannot be assured, consequently, dispersion availability of Ir becomes lower corresponding to the amount of Ir which is supported. Thus, catalytic activity of the hydrazinolysis catalyst is reduced, that is, because of the characteristics of the alumina, the thermal resistance of the catalyst is relatively low, so that catalyst life is limited.

SUMMARY OF THE INVENTION

It is therefore a principal object of the present invention to provide a method for preparing a hydrazinolysis catalyst so as to keep the catalytic activity thereof at high level.

It is another object of the present invention to provide a method for preparing a hydrazinolysis catalyst having long life.

It is a further object of the present invention to provide a method for preparing a hydrazinolysis catalyst having extended specific surface area so as to raise dispersion availability of Ir.

It is a still further object of the present invention to provide a method for preparing a hydrazinolysis catalyst having high thermal resistance.

It is a also an object of the present invention to provide a catalyst for hydrazinolysis having the above-mentioned characteristics.

In order to accomplish the aforementioned and other objects, a hydrazinolysis catalyst including an alumina support and iridium is prepared by a method comprising the following steps; that is, adding aluminum alkoxide into hexyleneglycol (2-methyl-2, 4-pentanediol) to form a mixture, forming a sol by heating said mixture, hydrolyzing the sol until changed to a gel, drying and calcining the gel to obtain the alumina support, and dispersing the iridium on the support. The alumina support is formed so as to have a specific surface area being substantially supportable of the iridium to keep catalytic activity of the catalyst at a high level.

The amount of iridium is preferably in a range of 5 to 30 wt %.

The heating temperature is preferably in a range of 100° C. to 200° C.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
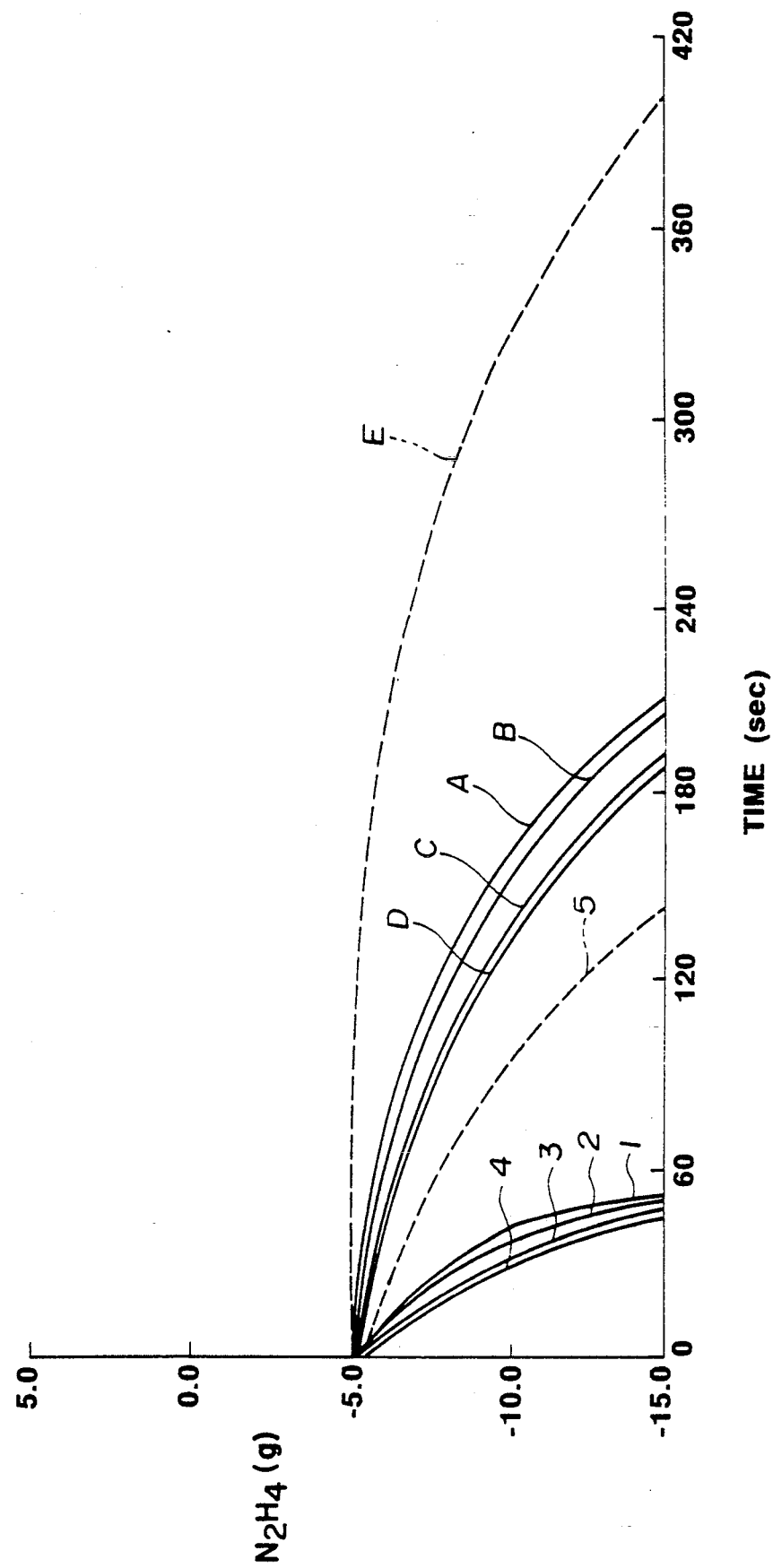
FIG. 1 is a graph showing results of the well known open cup test which indicates catalytic effect of catalysts according to the present invention and catalysts according to conventional art.

An alumina support is formed by sol-gel method according to Japanese Patent Application No. 63-221448 disclosed by the same inventor of the present invention, that is, first, aluminum alkoxide is added to hexyleneglycol (2-methyl-2, 4-pentanediol). Then, the mixture of aluminum alkoxide and hexyleneglycol is heated under temperatures between 101° C. to 200° C. until a mixed sol is formed. The mixture sol is hydrolyzed to raise gel formation. The obtained gel is dried and calcined. Thus, alumina having an extended specific surface area of at least 100 m²/g is prepared. As alumina, any configuration available, such as powdered, granulated, or coated having a three dimensional honeycomb structure is preferred.

A reagent including Ir is prepared in the form of a solution to be supported on the aforementioned alumina. Any solution can be used having characteristic solubility in solvents, such as an iridium chloride solution. Alternatively, solutions of organic solvents such as an ethanol solution of iridium chloride may be used. The prepared iridium solution is then dried and calcined for the alumina support to be dipped thereinto for impregnation. The alumina support is generally dipped from the center thereof, a supported amount of Ir is determined so as to obtain a substantial dispersion on the surface of the support. If the amount of Ir against the weight of catalyst becomes less than 5 wt %, it cannot reach the surface of the support. On the other hand, if the amount of Ir becomes more than or equal to 30 wt %, further amounts of Ir cannot disperse on the surface of the support, so that more than 30 wt % of Ir is not effective for dispersion. Therefore, 5 wt % to 30 wt % of Ir as compared to the amount of the catalyst is preferable for the dispersion amount desirable on the support.

Catalysts which are composed of alumina supports and Ir were formed by the following examples 1 to 5, and were compared to conventional catalysts which were formed by the following comparisons 1 to 5.

EXAMPLE 1

599.8 g of aluminum isopropoxide [Al(iso-OC$_3$H$_7$)$_3$] was poured into a beaker having a volume of 2000 ml. Then 540.9 g of hexyleneglycol was added. The mixture was stirred while heating in an oil bath adjusted at 120° C. for 4 hours. The temperature of the oil bath was reduced thereafter to 100° C. 449.5 g of water was added to the obtained solution of aluminum alkoxide.

After leaving overnight at the same temperature, the obtained gel was transferred into a flask, dried under vacuum conditions at temperatures between 120° and 170° C., then 195 g of dry gel was prepared. The obtained dry gel was calcined at 950° C. for 3 hours, so that, 150 g of white alumina powder was obtained.

10 g of the powder was impregnated by a solution of iridium chloride (Iridium content 1.4%) then dried, and hydrogen reduction was applied at 400° C. for 1 hour. Thus, a catalyst 1 was prepared. Iridium content of the catalyst 1 was 28.9%.

EXAMPLE 2

A catalyst 2 was prepared according to a similar method as for the above mentioned EXAMPLE 1, but the impregnated solution was an ethanol solution of iridium chloride. Iridium content of the obtained catalyst 2 was 29.1%.

EXAMPLE 3

A catalyst 3 was prepared according to a method similar to that for the above mentioned EXAMPLE 1, except that the calcining temperature was 600° C. Iridium content of the obtained catalyst 3 was 29.0%.

EXAMPLE 4

A catalyst 4 was prepared according to a method similar to that for the above mentioned EXAMPLE 2, except that temperature for baking was determined at 600° C. Iridium content of the obtained catalyst 4 was 28.8%.

EXAMPLE 5

A catalyst 5 was prepared according to a method similar to that for the above mentioned EXAMPLE 1, except that iridium content of the solution of iridium chloride was 0.18%. Iridium content of the obtained catalyst 5 was 5.1%.

COMPARISON 1

An alumina (SCS-79) was calcined at 900° C., then 10 g of obtained powder was impregnated with a solution of iridium chloride and dried. A hydrogen reduction was applied to dried mixture at 400° C. for 3 hours, thus a catalyst A was prepared. Iridium content of the obtained catalyst A was 29.0%.

COMPARISON 2

A catalyst B was prepared according to a method similar to that for the above mentioned EXAMPLE 2, except that the alumina (SCS-79) was calcined at 900° C. for 3 hours. Iridium content of the obtained catalyst B was 29.1%.

COMPARISON 3

A catalyst C was prepared according to a method similar to that for the above mentioned EXAMPLE 3, except that the alumina (SCS-79) was calcined at 600° C. for 3 hours. Iridium content of the obtained catalyst C was 28.8%.

COMPARISON 4

A catalyst D was prepared according to a method similar to that for the above mentioned EXAMPLE 4, except that the alumina (SCS-79) was calcined at 600° C. for 3 hours. Iridium content of the obtained catalyst D was 28.9%.

COMPARISON 5

A catalyst E was prepared according to a method similar to that for the above mentioned COMPARISON 1, except that the iridium content in the solution of iridium chloride was 0.18%. Iridium content of the obtained catalyst E was 5.2%.

A conventional open cup test was applied to the obtained catalysts 1 to 5 and A to E that is, 10 g of liquid hydrazine was weighed and poured into a glass vessel on an electric balance, then each catalyst was added thereto respectively. Weight loss of the hydrazine after addition of the catalyst was determined.

The obtained results are shown in Table 1 and FIG. 1.

TABLE 1

| catalyst | alumina | calcination temperature (°C.) | Ir content (%) | solvent | time for decomposition (sec) |
|---|---|---|---|---|---|
| 1 | sol-gel method | 950 | 28.9 | H$_2$O | 52 |
| 2 | sol-gel method | 950 | 29.1 | C$_2$H$_5$OH | 51 |
| 3 | sol-gel method | 600 | 29.0 | H$_2$O | 48 |
| 4 | sol-gel method | 600 | 28.8 | C$_2$H$_5$OH | 46 |
| A | SCS-79 | 900 | 29.0 | H$_2$O | 212 |
| B | SCS-79 | 900 | 29.1 | C$_2$H$_5$OH | 208 |
| C | SCS-79 | 600 | 28.8 | H$_2$O | 194 |
| D | SCS-79 | 600 | 28.9 | C$_2$H$_5$OH | 190 |
| 5 | sol-gel method | 950 | 5.1 | H$_2$O | 142 |
| E | SCS-79 | 950 | 5.2 | H$_2$O | 401 |

From the results of Table 1 and FIG. 1, catalysts applying the sol-gel method (catalysts 1 to 5) promoted the hydrazinolysis reaction substantially more rapidly than conventional catalysts (catalysts A to E). Especially, catalysts containing about 30 wt % of Ir (catalysts 1 to 4), significantly promoted the hydrazinolysis reaction, that is to say, the decomposition time of each catalyst according to the sol-gel method were not so varied. This indicates that catalysts according to the present invention maintain catalytic activity even if subjected to high temperatures.

According to the present invention, a specific surface area of alumina as a catalyst support can be extended by applying a sol-gel method. Therefore, a relatively large amount of iridium which catalyzes in hydrazinolysis can be supported on the surface of the alumina of the invention compared with alumina formed by conventional techniques. Thus, catalyst activity can be raised and kept at a high level, that is, the life of the catalyst can be extended. Furthermore, the thermal resistance of the catalyst can also be raised, thus, hydrazinolysis reaction can be highly promoted.

Figure 2:
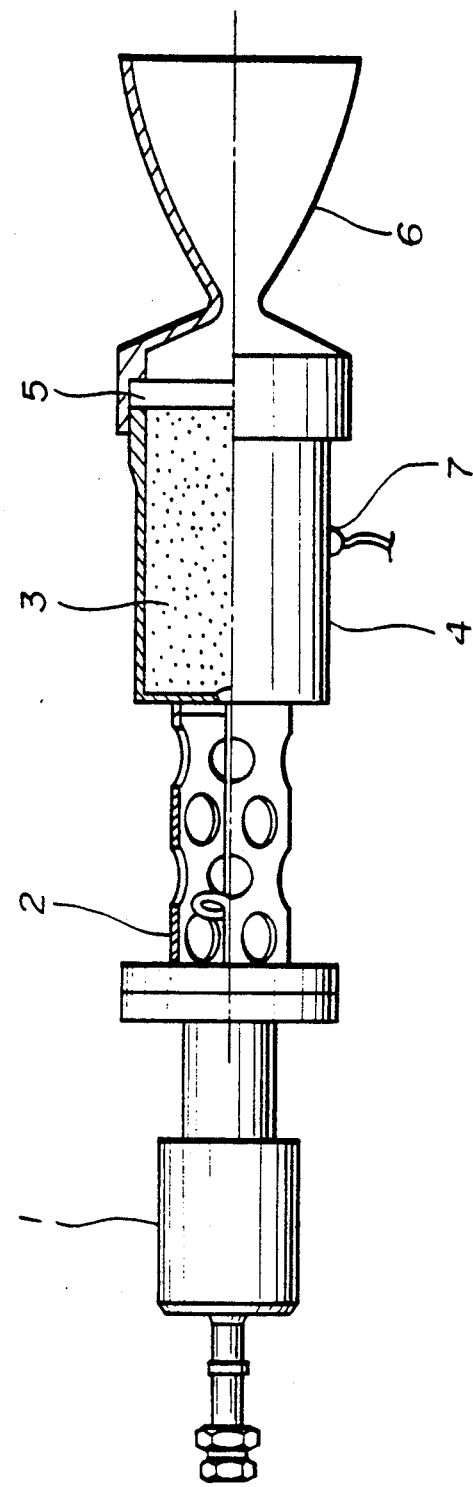
FIG. 2 is a sectional partial view of a side elevation of a hydrazine thruster to which a hydrazinolysis catalyst according to the present invention has been applied.

The catalyst according to the present invention may be applied to a hydrazine thruster as a thrust system for mounting on a satellite as shown in FIG. 2. Referring now to FIG. 2, an injection amount of liquid hydrazine for the hydrazinolysis reaction is controlled by a reagent valve 1. Liquid hydrazine injected from the reagent valve 1 is supplied via a mating stand-off 2 which acts as a heat protector for a catalyst bed 3 where the hydrazinolysis catalyst prepared by the method according to the present invention is charged, which catalyst bed is defined by a thrust chamber 4 and a catalyst bed plate 5. Then, hydrazine supplied into the catalyst is decomposed by an exothermic catalytic reaction. Ammonia and gas mixture of nitrogen and hydrogen are generated by the decomposed reaction, and these gases are injected from the thruster via a nozzle 6. Thus, thrust can be obtained effectively by a hydrazinolysis reaction promoted by the catalyst of the present invention.

While the present invention has been disclosed in terms of the preferred embodiment in order to facilitate better understanding of the invention, it should be appreciated that the invention can be embodied in various ways without, departing from the principle of the invention. Therefore, the invention should be understood to include all possible embodiments and modification to the shown embodiments which can be embodied without departing from the principle of the inventions as set forth in the appended claims.

What is claimed is:

1. A method for preparing a hydrazinolysis catalyst including alumina support and iridium, said method comprising the steps of;
    adding aluminum alkoxide into hexyleneglycol (2-methyl-2, 4-pentanediol) to form a mixture,
    preparing a sol by heating said mixture,
    hydrolyzing said sol until changed to a gel,
    drying and calcining said gel to obtain said alumina support, and
    dispersing said iridium on said support.

2. A method for preparing a hydrazinolysis catalyst as set forth in claim 1, wherein said amount of iridium is in a range of 5 to 30 wt %.

3. A method for forming a hydrazinolysis catalyst as set forth in claim 1, wherein the temperature of said heating is in a range of 101° C. to 200° C.

4. A catalyst for hydrazinolysis comprising;
    an alumina support prepared by:
    mixing aluminum alkoxide and hexyleneglycol (2-methyl-2, 4-pentanediol),
    heating the mixture to form a sol,
    hydrolyzing said sol to form a gel,
    drying and calcining said gel to obtain said alumina support, and
    dispersing iridium on said support.

5. A catalyst for hydrazinolysis as set forth in claim 4, wherein an amount of said iridium is in a range of 5 to 30 wt %.

* * * * *